United States Patent

Wigham

[15] 3,690,511

[45] Sept. 12, 1972

[54] CONVEYOR BELT SPACER FOR POTATO PLANTERS

[72] Inventor: Jack H. Wigham, 4206 N. E. 15th St., Amarillo, Tex. 79107

[22] Filed: Aug. 17, 1970

[21] Appl. No.: 64,402

[52] U.S. Cl. ................... 221/174, 221/236, 221/253, 221/259
[51] Int. Cl. ............................................... A01c 9/02
[58] Field of Search ............. 221/174, 185, 236, 253; 111/36, 42, 78, 85; 198/184, 203

[56] References Cited

UNITED STATES PATENTS

| 925,826 | 6/1909 | McWhorter | 221/174 |
| 1,035,191 | 9/1912 | Hist | 221/253 |
| 1,448,468 | 3/1923 | Sproull | 221/185 X |
| 2,362,168 | 11/1944 | Stokes | 198/184 |

*Primary Examiner*—Robert B. Reeves
*Assistant Examiner*—Larry Martin
*Attorney*—Ely Silverman

[57] ABSTRACT

A conveyor belt, sometimes referred to as a cell-belt, in the bottom of the bin of a potato planter having a cup conveyor chain driven by a sprocket on a cup conveyor drive shaft. The conveyor belt is intermittently advanced with seed potatoes thereon to a hopper where the seed potatoes are picked up by the regularly spaced cups on the cup conveyor chain and are thereafter deposited in a furrow in the earth. The means for intermittently advancing the belt is a cam-like action comprised of a sprocket contacted by a revolving arm on a shaft which is indirectly turned by the wheels supporting the planter.

3 Claims, 7 Drawing Figures

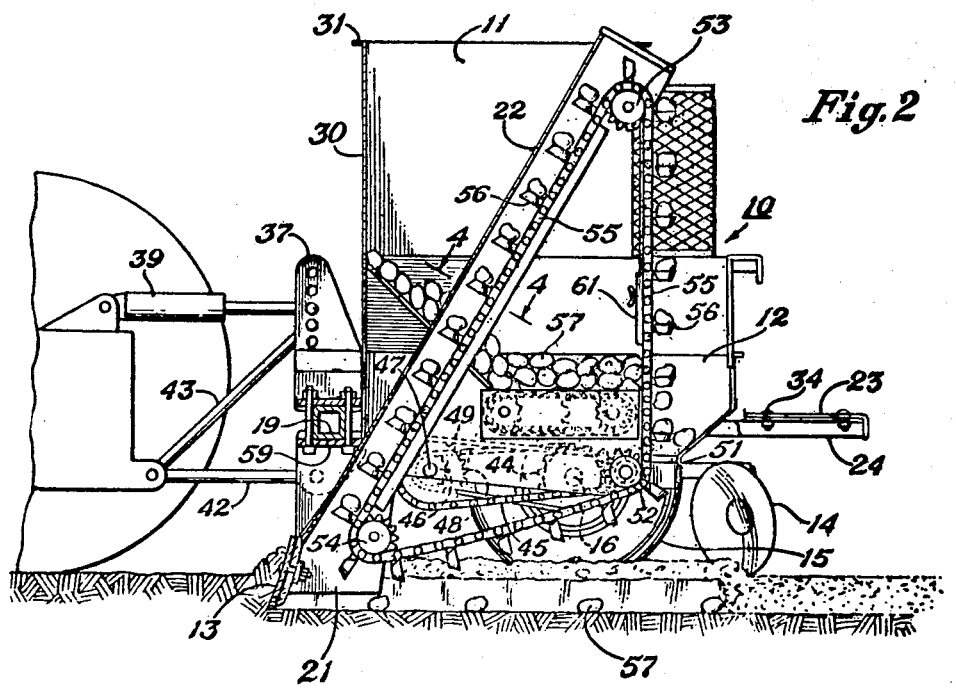
Fig.2
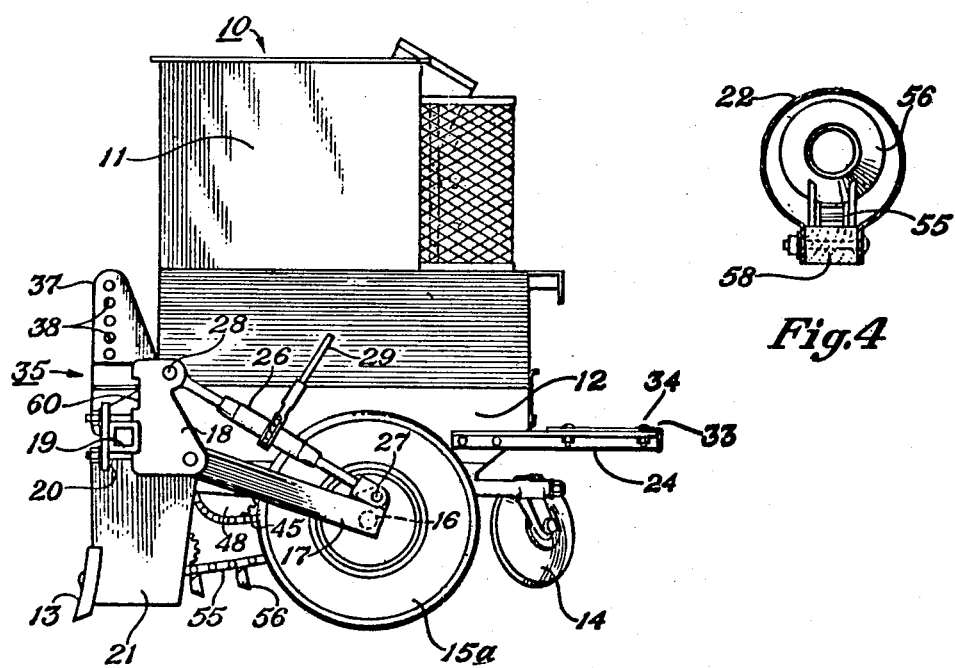
Fig.1
Fig.4

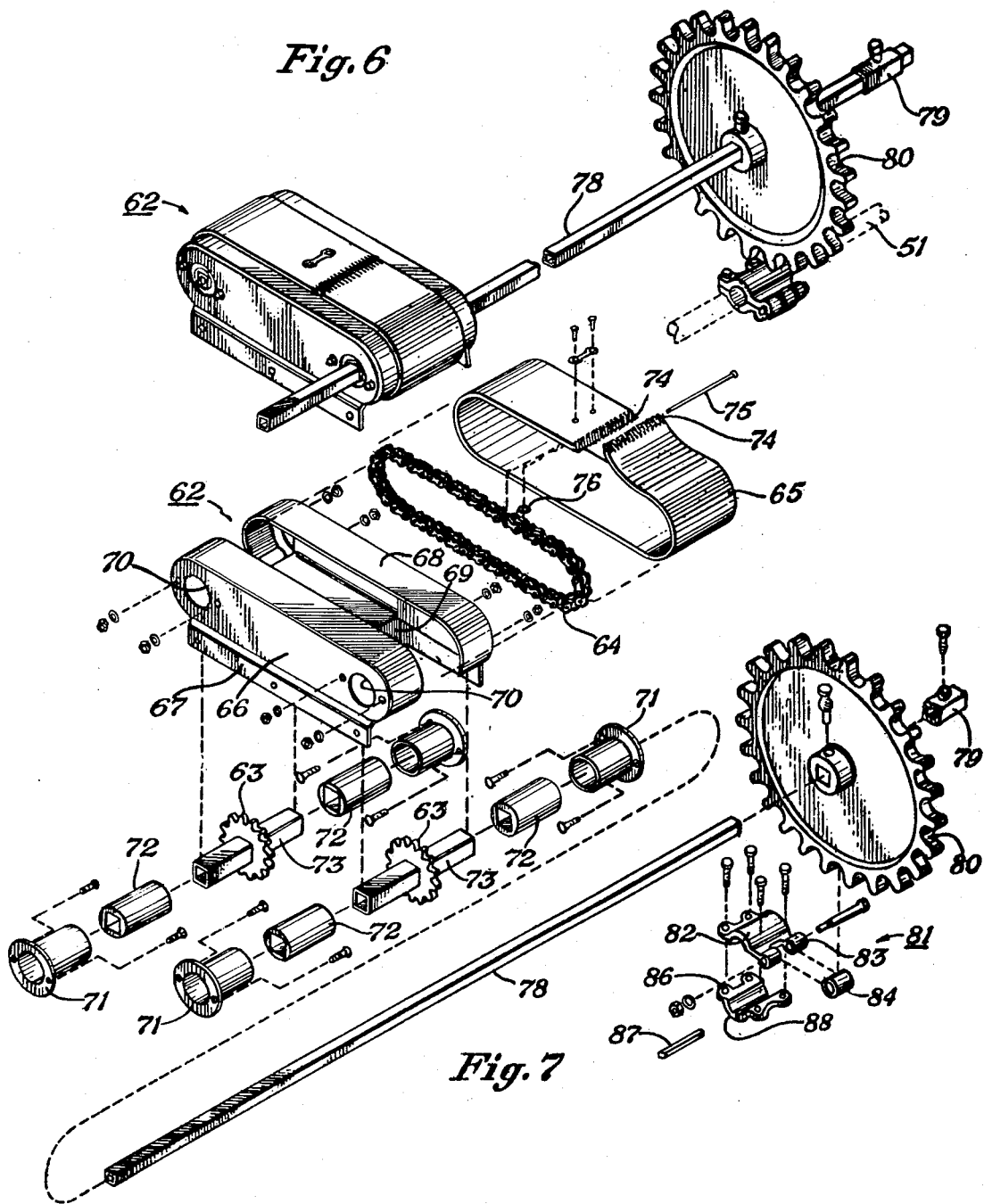

CONVEYOR BELT SPACER FOR POTATO PLANTERS

This invention relates to improvements in potato planters such as illustrated and described in my copending application, Ser. No. 716,740, now abandoned filed Mar. 28, 1968, and has reference to a metering belt assembly for spacing seed potatoes in a hopper before they are picked up by a chain having cups thereon for depositing them in a furrow.

An object of the invention is to provide, in a tractor drawn or mounted potato planter having a chain with cups thereon for lifting and discharging seed potatoes, means for preventing the cups from picking up doubles or skipping the seed during the planting operation.

The primary object of the invention is to provide a potato planter having an even flow of seed from the bin to the hopper from where they are picked up individually and equally spaced in a furrow.

Another object, in addition to the foregoing object, is to provide means whereby the spacing of the seed in the furrow is constant even though the planter may move at different speeds.

A particular object of the invention is to provide, in a potato planter, a seed spacing belt assembly in the form of a replaceable cartridge for expediting repairs or replacing worn parts.

Another object is to eliminate ratchet type spacing mechanisms heretofore used in potato planters and thereby reduce the manufacturing cost.

A further object is to provide a conveyor belt assembly as referred to having means for conveniently changing belt drive sprockets to sprockets of different diameters for increasing or decreasing the spacing action and for converting the potato planter to other uses, for example, handling manure.

Another object is to provide, in multiple row planters, means for conveniently spacing the referred to belts relative to each other when the spaces between furrows are changed.

A further object is to provide a conveyor belt construction in a potato planter wherein movement of the seed to the cup chain does not depend on gravity alone and whereby the capacity of the bins may be enlarged without increasing the height and largest transverse dimensions.

These and other objects of the invention will become apparent from the following description and the accompanying drawings, wherein:

FIG. 1 is a side elevational view of the planter.

FIG. 2 is a center line vertical section of the planter showing a typical attachment to a tractor.

FIG. 4 is an enlarged cross sectional detail taken along line 4—4 on FIG. 2.

FIG. 6 is a perspective view of a conveyor belt assembly for a potato planter in accordance with the invention, and FIG. 7 is an exploded view of the conveyor belt assembly illustrated in FIG. 6.

Figure 3:
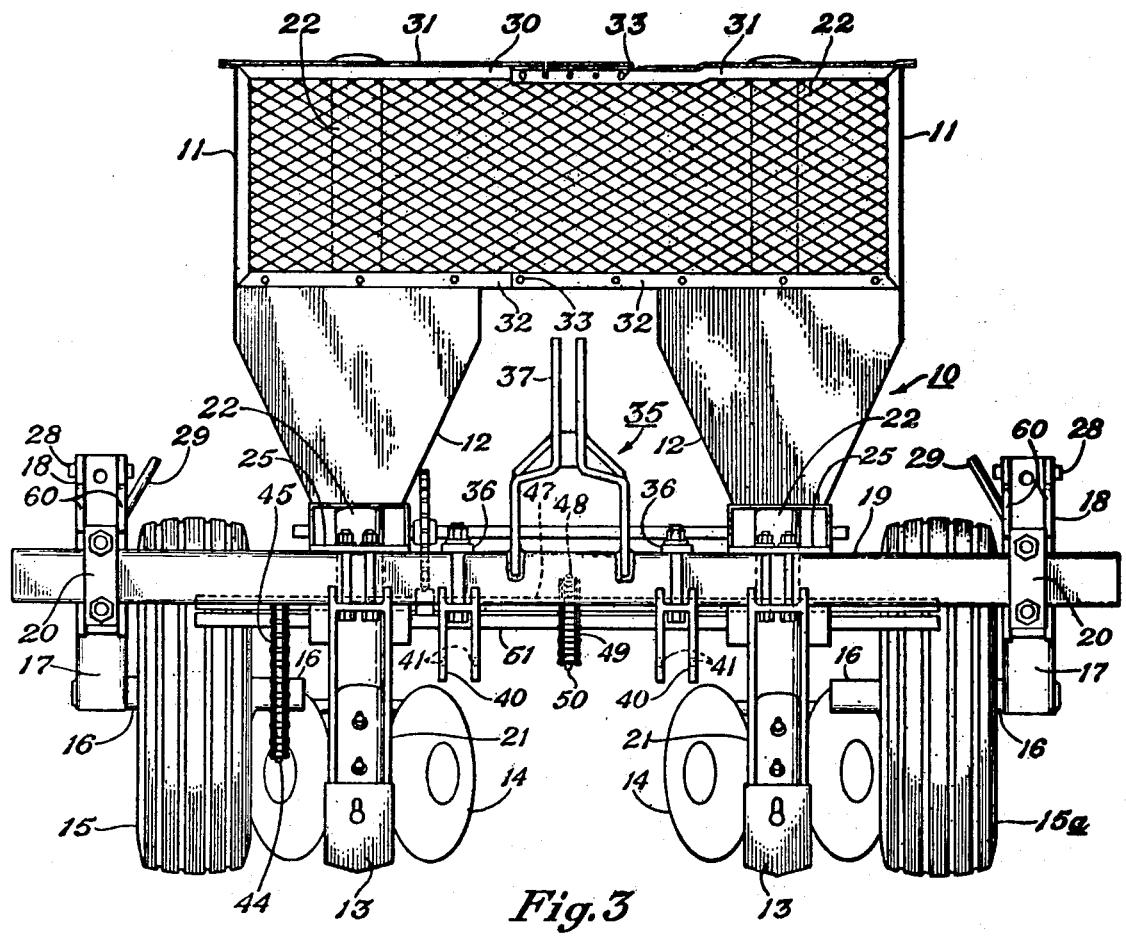
FIG. 3 is a front elevational view of a gang of two planters cut away to show a drive sprocket.

As illustrated in FIGS. 1 and 3, the planter 10 includes a bin 11 for carrying the bulk of the seed which empties by gravity to a hopper 12. A blade 13 on the front of the planter 10 cuts a furrow to a predetermined depth and a pair of adjustable discs 14 return the soil to the furrow after the potatoes are planted.

Bull wheels 15 and 15a on individual axles 16 ride at the ends of rearwardly extending cantilevers 17 which are pivotally attached to structurally rigid hinge blocks 18 on a heavy square or rectangular cross bar 19, extending the full width of the planter, by means of clamps 20. The blade 13 is adjustably attached to a plow unit 21 which forms the lower end of a conveyor tube 22 extending upwardly at an angle through the bin 11.

A running board 23 on brackets 24 extends the width of the planter on the rear and serves as a structural member as well as a platform from which a rider can observe the operation of the machine or reach into the hoppers if necessary. The plow units 21 are attached to the cross bar 19 by means of clamps 25. A turnbuckle 26 extends from a pivot 27 close to the axle 16 to a pivot 28 in the upper end of the hinge block 18 and can be adjusted in length by means of a reversible ratched wrench 29 which is a permanent part of the turnbuckle 26. Lengthening the turnbuckle 26 lowers the bull wheel 15, or conversely, raises the plow unit 21 or vice versa, thus making the depth of the furrow completely adjustable.

The front of the bin 11 consists of a screen 30 on frames 31 and 32. In a two row planter, as illustrated, the distance between the separate planter units can be adjusted by loosening the clamps 20 and 25 and sliding the units along the cross bar 19, and by changing the bolts 33 in the screen frames 31 and 32 and the bolts 34 in the running board 23 for which multiple holes (not shown) are provided.

Figure 5:
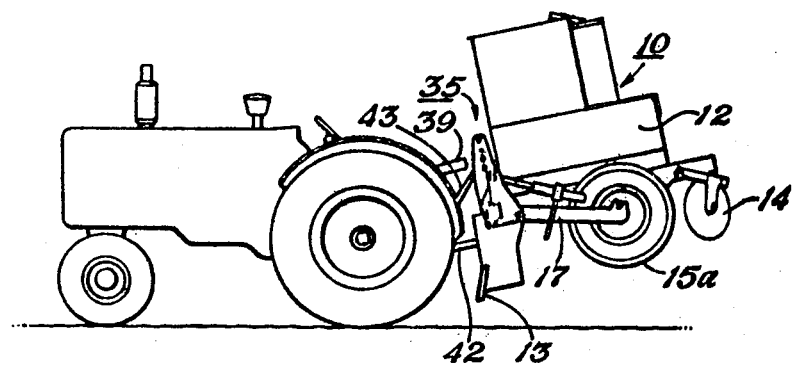
FIG. 5 is a reduced scale side elevational diagram showing the planter raised off of the ground by the hydraulic system of the tractor.

Referring now to FIG. 3, a three point hitch 35 is located at the center of the cross bar 19 and attached thereto by clamps 36. An upwardly extending torque arm 37 contains a series of holes 38 (FIG. 1) to one of which there is attached a hydraulic top link 39. A pair of depending brackets 40 are provided with holes 41 to which can be attached a tractor hitch 42 which is laterally rigid. A diagonal brace 43 maintains the hitch 42 at the same level, thus controlling the depth of the furrow cut by the blade 13. The entire planter can be raised off the ground as shown in FIG. 5 by the hydraulic system of the tractor.

Referring again to FIGS. 2 and 3, the bull wheel 15 is provided with a sprocket 44 which is connected by a chain 45 to a smaller sprocket 46 on a transverse drive shaft 47. The sprocket 46 can be adjusted lengthwise on the shaft 47 by means of a set screw or spline (not shown) to match the separation of the two planting units. A third sprocket 48 is fixed on the end of the shaft 47 at the center line between the two units and a chain 49 therefrom drives a sprocket 50 on a cup conveyor chain shaft 51 to which conveyor drive sprockets 52 are adjustably attached. An idler sprocket 53 is mounted at the top of the conveyor tube 22 and a second idler sprocket 54 is located at the lower end of the conveyor tube 22. A cup conveyor chain 55 is threaded through the tube 22 and on the said three sprockets 52, 53 and 54, and in operation the chain rises vertically through the hopper 12 and downward through the tube 22. The cup conveyor chain 55 is provided with equally spaced cupped rings 56 which pick up seed potatoes 57 in their concave sides on the upward leg of the circuit. As the chain 55 turns over the upper sprocket 53 the potatoes fall onto the backs of the preceding rings 56 and ride down the diagonal leg of the circuit, falling off into the furrow as the cup chain 55 turns around the lower forward sprocket 54. A hardwood runner 58 is set into the back of the conveyor tube 22 to carry the weight of the chain 55 of its downward leg. If it is desired to combine two of the two row planters herein described to make a four row rig, an additional square or rectangular cross bar (not shown) exactly like the cross bar 19 but twice as long, is inserted in the square holes 59 in the torque arm 37 of the center hitch 35. A double length cross bar (not shown) is substituted for the cross bar 19. Notches 60 are provided in the hinge blocks 18 for the second cross bar so that it can be secured with clamps similar to the first cross bar clamps 20. The center hitch 35 is located midway between the two two-row units comprising the four row rig. A vertically adjustable gate 61 is provided between each bin 11 and hopper 12 for regulating the movement of seed potatoes into the latter. It is to be noted that the front walls of the bins 11 are vertical as compared with the sloped walls of the bins heretofore used for feeding the hoppers 12 by gravity. However, the lower portions of the side walls of the bins 11 are sloped and receive the cartridges to be described.

The conveyor belt assembly shown in FIGS. 6 and 7 includes a belt cartridge which is generally comprised of a removable frame 62, chain sprockets 63 in each end of the frame, a belt chain 64 around the sprockets and a belt 65 around and driven by the chain. The frame 62 is comprised of parallel side walls 66 having depending and slightly outwardly spaced depending vertical flanges 67 for attachment to the inner lower walls of a bin 11, inwardly directed parallel belt slides 68 along the tops of the walls 66 and arcuate at their ends, and a recessed channel shaped chain slide 69 between the inner and upper horizontal edges of the belt slides and openings 70 in the side of the walls for accommodating flanged bearing housings 71. In FIGS. 6 and 7 numerous screws, nuts and washers are shown but are not numbered; however, dashed lines in FIG. 7 shows their assembled locations. Cylindrical bearings 72 are rotatably received in the bearing housings 71, and which bearings have square openings for receiving square drive collars 73. The lengths of the collars 73 are substantially equal to the width of frame 62 and it is obvious that one of the collars could be a round shaft, not shown, instead of being square.

The belt 65 is wide enough to at least partially cover the belt slides 68, and which belt is assembled by metal laces 74 in adjoining ends and a pin 75 therethrough. A transverse coupler 76 on the chain 64 engages the inner surface of the belt 65 and is held in place by a link washer 77 on the outer surface of the belt. Rivets or screws, not numbered, may be used for this purpose.

A square shaft 78, parallel with the previously described cup conveyor chain shaft 51, extends through aligned openings in the square drive collars 73 of at least two described belt assemblies and is located in place by one or more set collars 79. If there should be only one belt assembly, then an extending end of the square shaft 78 would be journaled in a suitable support, not shown. The belt 65 is intermittently advanced by a sprocket 80 on the square shaft 78 and an arm assembly 81 on the cup conveyor chain shaft 51. The arm assembly 81 shown is in the form of a clamp having an arcuate body 82, lateral spaced projections 83 on the body, a roller 84 between the projections and mounted on a pin 85, and a cap 86 on the body for clamping the arm assembly in place. As shown, the arm assembly 81 may include a key 87 and slots 88 in the body and in the round shaft 51 to prevent relative rotation.

In operation the described potato planter is drawn by a tractor with seed potatoes 57 in the bin or bins 11. A bull wheel 15, by transmission of power through the chains 45–49, causes the cup conveyor chain shaft 51 to rotate as the planter is moved. With each rotation of the last referred to shaft 51 the roller 84 of the arm assembly 81 engages a tooth on the sprocket 80 on the square shaft 78, thus causing upper surface of the belt 65 to move toward the hopper 12. Continued rotation of the arm assembly 81 intermittently feeds seed potatoes on the belt beneath the gate 61 and into the hopper where they are singularly placed and where they are picked up by the cups 56 on the cup conveyor chain 55. Subsequently the potatoes are dropped into the furrow made by the blade 13. As before stated, the sprocket 80 on the square shaft 78 may be changed to a sprocket of a different diameter, but in which case the lengths of the arm assembly projections 83 will be changed accordingly. The foregoing description will permit changing the distance between belt assemblies when distances between bins 11 are changed. Also, from the foregoing, it will be obvious that a belt cartridge may be removed or installed by removing and replacing bolts in the frame flanges 67 and the side walls of the bins after first removing the square shaft 78.

The invention is not limited to the exemplary constructions herein shown and described, but may be made in various ways within the scope of the appended claims.

What is claimed is:

1. In a conveyor belt assembly for installation in the bottom of a bin comprising a part of a tractor attached potato planter having a cup chain for receiving seed potatoes from said bin and depositing them in a furrow, means driving said cup chain, said conveyor belt assembly comprising a horizontal endless belt having a discharge end adjacent said cup chain and means driving said belt at a regulated speed, and wherein said means driving said cup chain includes a driven shaft and a belt drive shaft parallel with each other, a sprocket on said belt drive shaft and at least one projection on said driven shaft and of a length to engage a tooth of said sprocket upon each revolution of the driven shaft, and including a frame having parallel sides, a belt chain, belt chain sprockets journaled in bearings in the sides of said frame, means movably supporting said endless belt on said frame and around said belt chain and means connecting said belt chain with said belt.

2. A conveyor belt assembly as defined in claim 1, and including a hopper adjacent the discharge end of said belt assembly and receiving the cups of said cup chain therein, and an adjustable gate between said bin and said hopper.

3. A conveyor belt assembly as defined in claim 1, and wherein said means connecting said belt chain with said belt includes a coupler mounted on said chain.

* * * * *